United States Patent
Plow et al.

(10) Patent No.: US 7,716,597 B2
(45) Date of Patent: May 11, 2010

(54) DYNAMIC MATERIALIZATION OF DISAPPEARING ENTITIES

(75) Inventors: Gregory M. Plow, Gilroy, CA (US); Farrokh E. Pourmirzaie, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 985 days.

(21) Appl. No.: 10/815,430

(22) Filed: Mar. 31, 2004

(65) Prior Publication Data

US 2005/0228814 A1    Oct. 13, 2005

(51) Int. Cl.
*G06F 3/048* (2006.01)
(52) U.S. Cl. ............... 715/784; 715/786; 715/787; 715/805; 715/825
(58) Field of Classification Search ......... 715/784–787, 715/804–805, 792, 789, 811, 817, 821, 823, 715/825, 830
See application file for complete search history.

(56) References Cited

U.S. PATENT DOCUMENTS

| | | | | |
|---|---|---|---|---|
| 4,663,615 A | | 5/1987 | Hernandez et al. | 340/721 |
| 5,040,131 A | * | 8/1991 | Torres | 715/810 |
| 5,337,406 A | | 8/1994 | Takakura et al. | 395/148 |
| 5,339,391 A | * | 8/1994 | Wroblewski et al. | 345/607 |
| 5,479,600 A | | 12/1995 | Wroblewski et al. | 395/157 |
| 5,781,785 A | * | 7/1998 | Rowe et al. | 715/513 |
| 5,806,079 A | * | 9/1998 | Rivette et al. | 715/512 |
| 5,859,638 A | | 1/1999 | Coleman et al. | 345/341 |
| 5,860,074 A | * | 1/1999 | Rowe et al. | 715/526 |
| 5,903,267 A | * | 5/1999 | Fisher | 715/786 |
| 6,014,140 A | * | 1/2000 | Strand | 345/684 |
| 6,085,187 A | * | 7/2000 | Carter et al. | 707/3 |
| 6,147,683 A | * | 11/2000 | Martinez et al. | 715/786 |
| 6,369,811 B1 | * | 4/2002 | Graham et al. | 715/764 |
| 6,533,822 B2 | * | 3/2003 | Kupiec | 715/531 |
| 6,647,534 B1 | * | 11/2003 | Graham | 715/526 |
| 6,826,729 B1 | * | 11/2004 | Giesen et al. | 715/837 |

(Continued)

FOREIGN PATENT DOCUMENTS

EP    0 488 925 A2    6/1992

(Continued)

OTHER PUBLICATIONS

Weverka and Reid, "Word 2000: The Complete Reference," 1999, pp. 59-70 and 118-121.

(Continued)

*Primary Examiner*—Ba Huynh
*Assistant Examiner*—Nicholas Augustine
(74) *Attorney, Agent, or Firm*—Janet M. Skafar; Terrence J. Carroll; Christine H. Smith

(57) ABSTRACT

In various embodiments, a method, computer system and computer program product for displaying information are provided. A first subset of information of the file is presented in a scrollable area. The first subset of information comprises, at least in part, a second subset of information. The second subset of information is designated as a materialization entity. When the file in the scrollable area is scrolled and at least a portion of the materialization entity is scrolled out of the scrollable area, the materialization entity is displayed, at least in part, in a materialization area.

48 Claims, 12 Drawing Sheets

U.S. PATENT DOCUMENTS

| | | | |
|---|---|---|---|
| 7,103,851 B1 * | 9/2006 | Jaeger | 715/786 |
| 7,228,492 B1 * | 6/2007 | Graham | 715/500 |
| 2002/0054132 A1 * | 5/2002 | Meier et al. | 345/784 |

FOREIGN PATENT DOCUMENTS

| | | |
|---|---|---|
| EP | 0411749 B1 | 12/1995 |
| JP | 01126685 A | 5/1989 |
| JP | 03024594 A | 2/1991 |
| JP | 7-28618 | 1/1995 |
| JP | 07028618 A | 1/1995 |

OTHER PUBLICATIONS

Mansfield, "Mastering Word 97," Fourth Edition, 1997, pp. 54-59.

TMUG (Tri-Valley Macintosh User's Group), vol. 17, No. 4, Apr. 2002, pp. 1-8.

International Search Report, International application No. PCT/EP2005/050738, Applicant's file reference SVL030143, Date of mailing of the international search report Oct. 26, 2005.

W3C, "Extensible Markup Language (XML) 1.0", [online] W3C Recommendation Feb. 10, 1998 [Retrieved on Mar. 24, 2008] Retrieved from the Internet: <URL: http://www.w3.org/TR/1998/REC-xml-19980210> <34 pages>.

Written Opinion, International application No. PCT/EP2005/050738, Applicant's file reference SVL030143, Date of mailing of the Written Opinion Oct. 26, 2005 <5 pages>.

Written Opinion, International application No. PCT/EP2005/050738, Applicant's file reference SVL030143, Date of mailing of the Written Opinion Oct. 26, 2005 <6 pages>.

* cited by examiner

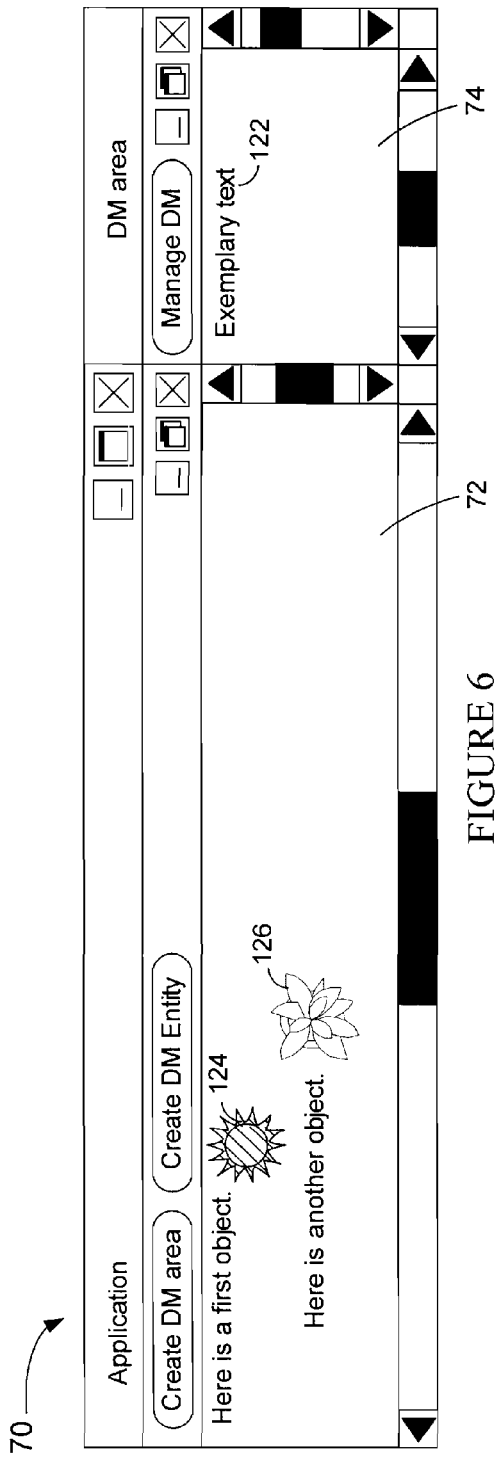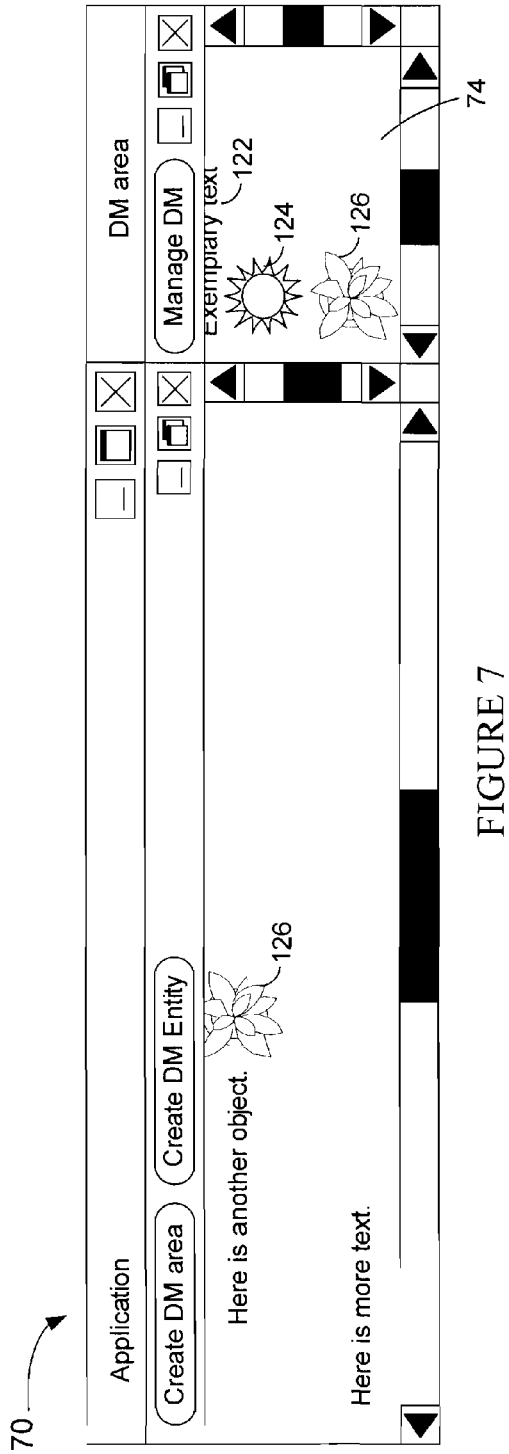
FIGURE 6
FIGURE 7

DYNAMIC MATERIALIZATION OF DISAPPEARING ENTITIES

BACKGROUND OF THE INVENTION

1. Field of the Invention

This invention relates to displaying information in windows, and more particularly, to dynamically materializing disappearing entities.

2. Description of the Related Art

Large files in combination with a limited amount of display area on display devices continue to present problems for a user of applications and tools encompassing those files. Although many enhancements have been made over the years, significant problems still remain.

One conventional method used to display the information in a large file is to present the file in a scrollable area on the display, with various user controls, such as a scroll bar or search dialog box, and display a portion of the file containing the information or data (text and/or graphic) of interest. When the user scrolls the file, the previously displayed information may be entirely scrolled off the display screen. For example, a user may be scrolling or searching through a large file containing a historical document. The user is searching for particular passages to illustrate a particular point. The document is so large that two passages-of-interest cannot be displayed simultaneously in the scrollable area. However, the user would like to see the passages-of-interest simultaneously on the display, and not have them scrolled out of view with each successive search or scroll operation.

The user could open a second application and copy and paste the desired information on the window of the second application. However, manually opening another application and performing the copy and paste is cumbersome and inconvenient.

One word processing application, Microsoft® (Registered Trademark of Microsoft Corporation) Word, displays a clipboard with copied text alongside a file in a scrollable area. However, text is not automatically placed on the clipboard as it scrolls out of view.

Therefore there is a need for a technique that allows a user to automatically view information that has scrolled out of view.

SUMMARY OF THE INVENTION

To overcome the limitations in the prior art described above, and to overcome other limitations that will become apparent upon reading and understanding the present specification, various embodiments of a method, computer system and computer program product for displaying information are disclosed.

In various embodiments, a method, computer system and computer program product display information. A first subset of information of the file is presented in a scrollable area. The first subset of information comprises, at least in part, a second subset of information. The second subset of information is designated as a materialization entity. When the file in the scrollable area is scrolled and at least a portion of the materialization entity is scrolled out of the scrollable area, the materialization entity is displayed, at least in part, in a materialization area.

In this way, when desired information no longer appears in a scrollable area, that information can be automatically displayed in a materialization area. Therefore, the user may view desired information even when that information has scrolled out of view from a scrollable area.

BRIEF DESCRIPTION OF THE DRAWINGS

The teachings of the present invention can be readily understood by considering the following detailed description in conjunction with the accompanying drawings, in which:

FIG. 6 depicts an embodiment of the scrollable area and DM area of FIG. 2 as the file is scrolled;

FIG. 7 depicts an embodiment of the exemplary scrollable area and DM area of FIG. 2 as the file is further scrolled;

To facilitate understanding, identical reference numerals have been used, where possible, to designate identical elements that are common to some of the figures.

DETAILED DESCRIPTION

After considering the following description, those skilled in the art will clearly realize that the teachings of the various embodiments of the present invention can be utilized to display information. In various embodiments, a method, apparatus and article of manufacture display information. A first subset of information of the file is presented in a scrollable area. The first subset of information comprises, at least in part, a second subset of information. The second subset of information is designated as a materialization entity. When the file in the scrollable area is scrolled and at least a portion of the materialization entity is scrolled out of the scrollable area, the materialization entity is displayed, at least in part, in a materialization area. In the various embodiments, the materialization entity refers to a dynamic materialization (DM) entity. In some embodiments, a DM attribute is associated with a subset of information or data in a file to designate the subset of information as a DM entity.

Figure 1:
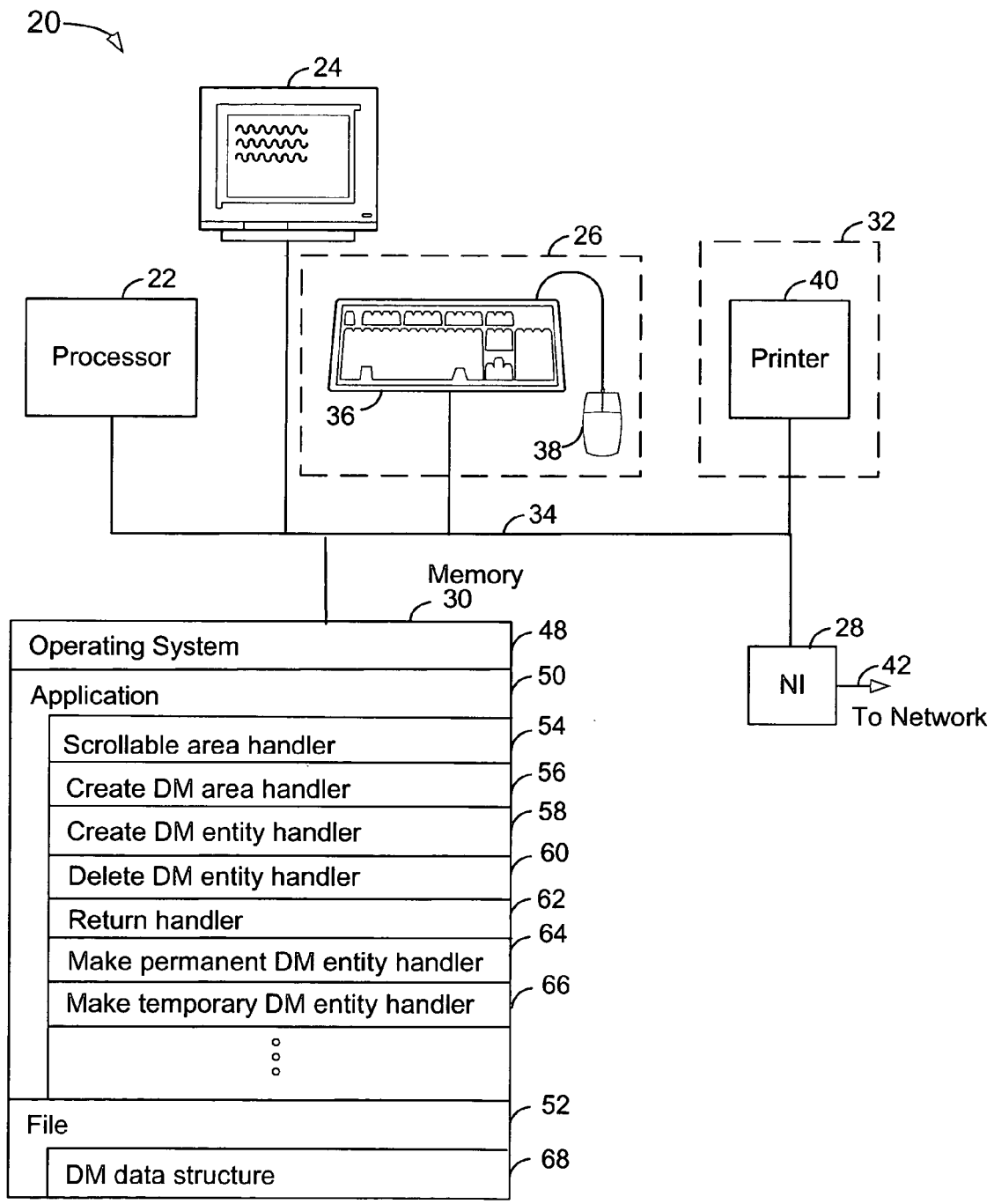
FIG. 1 depicts an illustrative computer system which uses various embodiments of the present invention.

FIG. 1 depicts an illustrative computer system which uses various embodiments of the present invention. The computer system 20 comprises a processor 22, display 24, input interfaces (I/F) 26, communications interface 28, memory 30 and output interface(s) 32, all conventionally coupled by one or more buses 34. The input interfaces 26 comprise a keyboard 36 and mouse 38. The output interface 32 is a printer 40. The communications interface 28 is a network interface (NI) that allows the computer 20 to communicate via a network, such as the Internet. The communications interface 28 may be coupled to a transmission medium 42 such as, a network transmission line, for example twisted pair, coaxial cable or fiber optic cable. In another exemplary embodiment, the communications interface 28 provides a wireless interface, that is, the communications interface 28 uses a wireless transmission medium.

The memory 30 generally comprises different modalities, illustratively semiconductor memory, such as random access memory (RAM), and disk drives. In some embodiments, the memory 30 stores an operating system 48, an application 50 and at least one file 52. The application 50 typically displays the information in the file 52. In various embodiments, the application 50 comprises at least one handler to respond to events associated with a graphical user interface. In some embodiments, the handlers comprise at least one or a combination of a scrollable area handler 54, a create DM area handler 56, a create DM entity handler 58, a delete DM entity handler 60, a return handler 62, a make permanent DM entity handler 64, and a make temporary DM entity handler 66.

The scrollable area handler 54 typically implements the scrolling operation and displays DM entities in one or more DM areas. The create DM area handler 58 creates a DM area. In some embodiments, the create DM area handler 58 creates a separate window with the DM area. The create DM entity handler 58 creates a DM entity. In some embodiments, the create DM entity handler creates a temporary DM entity, and alternately, a permanent DM entity. The delete DM entity handler 60 deletes a DM entity. The return handler 62 repositions the file to display a desired DM entity in the scrollable area. The make permanent DM entity handler 64 designates a DM entity as or changes the DM entity to permanent. The make temporary DM entity handler 66 designates a DM entity as or changes the DM entity to temporary.

In other embodiments, the file 52 may be remotely located from the application 50 on another computer system and be accessed via the network. In some embodiments, the file 52 stores information regarding the DM entity in a DM data structure 68.

In various embodiments, the specific software instructions, data structures and data that implement various embodiments of the present inventive technique are typically incorporated in the application 50. Generally, an embodiment of the present invention is tangibly embodied in a computer-readable medium, for example, the memory 30 and is comprised of instructions which, when executed by the processor 22, cause the computer system 20 to utilize the present invention. The memory 30 may store a portion of the software instructions, data structures and data for any of the operating system 48, application 50 and file 52 in semiconductor memory, while other portions of the software instructions and data are stored in disk memory.

The operating system 48 may be implemented by any conventional operating system, such as z/OS® (Registered Trademark of International Business Machines Corporation), AIX® (Registered Trademark of International Business Machines Corporation), UNIX® (UNIX is a registered trademark of the Open Group in the United States and other countries), WINDOWS® (Registered Trademark of Microsoft Corporation) and LINUX® (Registered trademark of Linus Torvalds).

In various embodiments, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier or media. In addition, the software in which various embodiments are implemented may be accessible through the transmission medium, for example, from a server over the network. The article of manufacture in which the code is implemented also encompasses transmission media, such as the network transmission line and wireless transmission media. Thus the article of manufacture also comprises the medium in which the code is embedded. Those skilled in the art will recognize that many modifications may be made to this configuration without departing from the scope of the present invention.

The exemplary computer system illustrated in FIG. 1 is not intended to limit the present invention. Other alternative hardware environments may be used without departing from the scope of the present invention.

Figure 2:
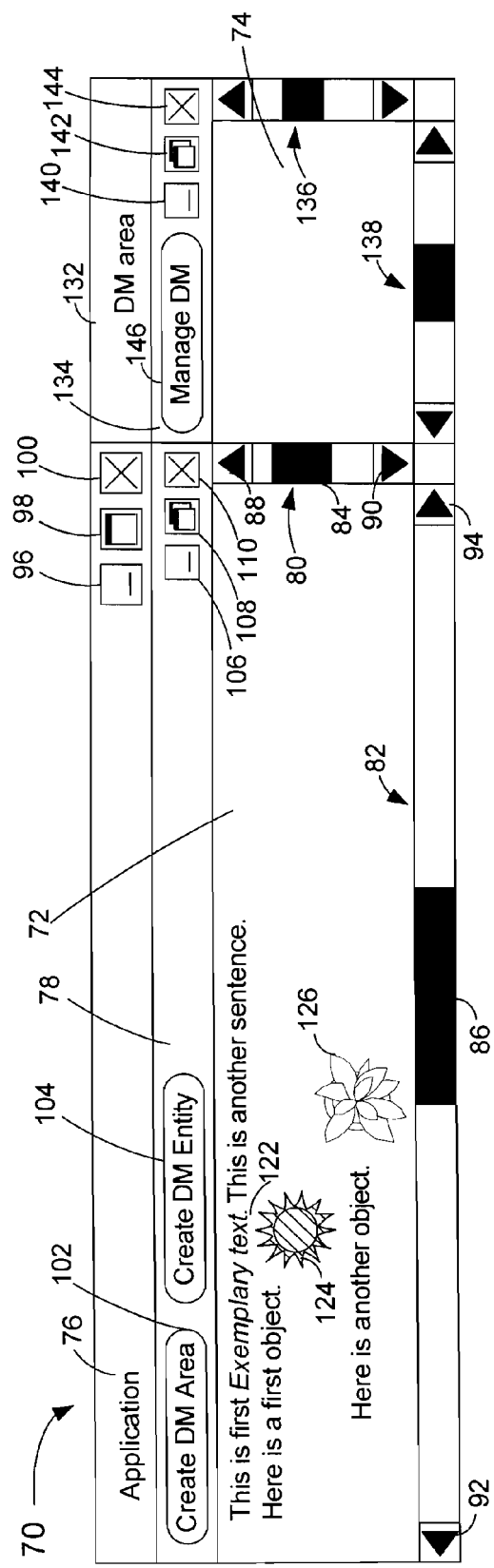
FIG. 2 depicts an embodiment of a scrollable area and dynamic materialization (DM) area.

FIG. 2 depicts an embodiment of a first window 70 having a first scrollable area 72 and a materialization or DM area 74. In various embodiments, within the first window, the DM area may be positioned to the left, right, above or below the first scrollable area 72. The first scrollable area 72 is for displaying a file. In various embodiments, the first window 70 has a first title bar 76 and first control area 78. The first scrollable area 72 is associated with vertical and horizontal scrollbars, 80 and 82, respectively. The vertical scrollbar 80 is on the right side of the scrollable area 72 and the horizontal scrollbar 82 is at the bottom of the scrollable area 72. In another embodiment, a single scrollbar is used. In an alternate embodiment, the vertical scrollbar is to the left of the scrollable area 72. In another alternate embodiment, the horizontal scrollbar is at the top of the scrollable area 72. The scrollbars, 80 and 82, have a slider, 84 and 86, and opposing arrows, 88 and 90, and 92 and 94, respectively, which can be used to scroll through the file.

In various embodiments, the first title bar 76 has the name of the application in addition to the well-known minimize, maximum and close buttons, 96, 98 and 100, respectively. In some embodiments, the first control area 78 has a create DM area button (Create DM Area) 102 to create the DM area 74. In various embodiments, the first control area 78 has a create DM entity button (Create DM Entity) 104 to create a DM entity. In other embodiments, the first control area 78 also has at least one of the minimize, maximize and close buttons, 106, 108 and 110, respectively. For example, the minimize, maximize and close buttons, 106, 108 and 110, respectively, of the first control area 78 may be used when a plurality of scrollable areas 72 are present within the first window 70. Alternately, the first control area is omitted.

In various embodiments, a file comprises various types of information, including, and not limited to, text strings and objects. An object typically comprises graphical information or data. In some embodiments, an object also comprises text strings, animated objects, icons, and other objects known to those of ordinary skill in the art.

Typically, a file may have many DM entities. DM entities typically comprise mutually exclusive subsets of information. In some embodiments, the DM entities may overlap. In various embodiments, the DM entity comprises at least one text string, at least one object, or a combination thereof. In some embodiments, the DM entity appears and behaves the same as other text or objects being displayed as long as the object or text remains on the display. That is to say, as various interactions occur between the user and application 50, the behavior of displayed non-DM information is not distinguishable from a displayed DM entity as long as either remains entirely within the first scrollable area 72.

Non-DM information refers to the text and objects that are not DM entities. In other embodiments, the DM entity has a different appearance from non-DM information to visually distinguish the DM entity from other information within the first scrollable area 72. Alternately, the DM entity behaves differently from non-DM information.

Figure 3:
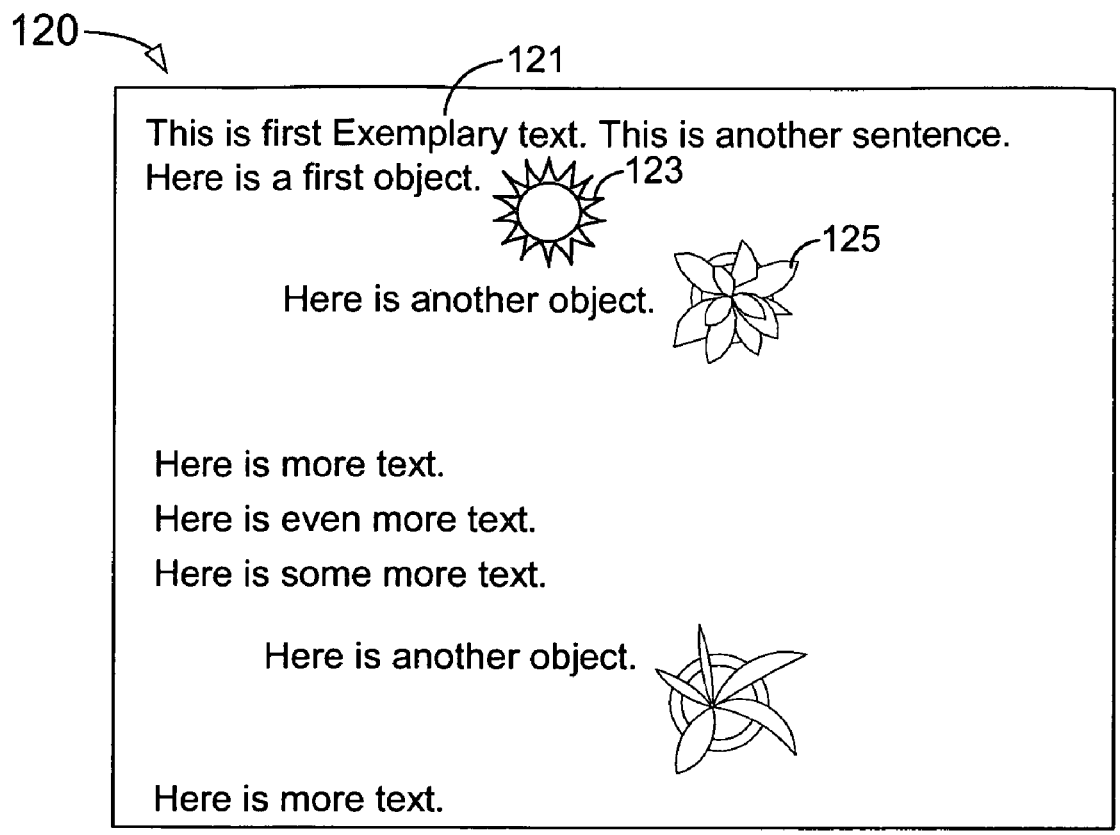
FIG. 3 depicts an exemplary file.

FIG. 3 depicts an exemplary file 120, a portion of which is displayed in FIG. 2. Referring to both FIGS. 2 and 3, a subset of the text, "Exemplary text" 121 of the file 120 is designated as a first DM entity 122. In this example, the text string of the first DM entity 122 is italicized to indicate to the user that the text is a DM entity. In other embodiments, other indications can be used such as underlining, bold, changing font, changing font color, changing the background color of the entity, and flashing the DM entity. In one alternative embodiment, the DM entity 122 remains visually unaltered within the first scrollable area 72.

A first exemplary object 123 is designated as a second DM entity 124. In this example, the second DM entity 124 is shaded to indicate that it is a DM entity. In other embodiments, other indications or no indications can be used, as discussed above.

A second exemplary object 125 is designated as a third DM entity 126. The appearance of the third DM entity 126 is not modified.

In some embodiments, a sound may be generated when the cursor or mouse passes over a DM entity. In other embodiments, a sound may generated when a DM entity scrolls out of view. Alternately, another sound may be generated when a DM entity scrolls into view.

In some embodiments, a user clicks on the create DM area button (Create DM Area) 102 in the first control area 78 and the DM area 74 appears. Alternately, the DM area 74 appears when at least a portion of a DM entity is scrolled out of view. In another embodiment, the create DM area button 102 is omitted. In various embodiments, the DM area 74 is part of the window containing the scrollable area 72. In some embodiments, the DM area 74 is associated with a DM title area 132 and a DM control area 134. Alternately the DM area 74 is not associated with a DM title area 132 and/or DM control area 134. In various embodiments, the DM area 74 is also associated with vertical and horizontal scrollbars, 136 and 138, at the right and the bottom, respectively. Alternately, a single scrollbar is associated with the DM area. In another embodiment, the vertical scrollbar is to the left of the DM area. In yet another embodiment, the horizontal scrollbar is at the top of the DM area. In some embodiments, when a DM area is associated with scrollbars, a portion of a DM entity may be displayed in the DM area and the DM area is scrolled or resized to display the entire DM entity. In yet another embodiment, the DM area does not have scrollbars.

In various embodiments, in the DM control area 134, at least one, or a combination, of the well-known minimize, maximum and close buttons, 140, 142 and 144, is used to reduce the size of the DM area, enlarge the DM area, and close or delete the DM area, respectively. Alternately, no minimize, maximum and close buttons are used. In some embodiments, the DM control area 134 also has a manage DM button (Manage DM) 146 which, when clicked on, presents the user with a menu of choices to manage the DM entity or entities.

Alternately, the DM area 74 is in a different window, referred to as a materialization or DM window, from the first window which contains the scrollable area. In various embodiments, the DM window comprises the DM title area 132, DM control area 134, DM scrollable area 74 and scrollbars 136 and 138. Alternately, the DM window may have a single scrollbar. One or more scrollbars may be positioned with respect to the DM area as described above. In other embodiments, the DM window may have no scrollbars. In yet other embodiments, the DM window does not have a title area and/or control area.

Typically, when a DM entity, or portion of a DM entity, is initially displayed in a DM area in a DM window, the DM window is a top window. In one embodiment, the DM window is adjacent the first window. In various embodiments, the DM window may be positioned to the right, left, above or below the first window. In some embodiments, the user may reposition the DM window.

When scrolling the file, either up, down, left or right, in the scrollable area when at least a portion of, or alternately, the entire DM entity moves out of view of or past the currently displayed scrollable area in the first window, at least a portion of the DM entity, and in some embodiments, the entire DM entity, appears in the DM area.

Figure 4:
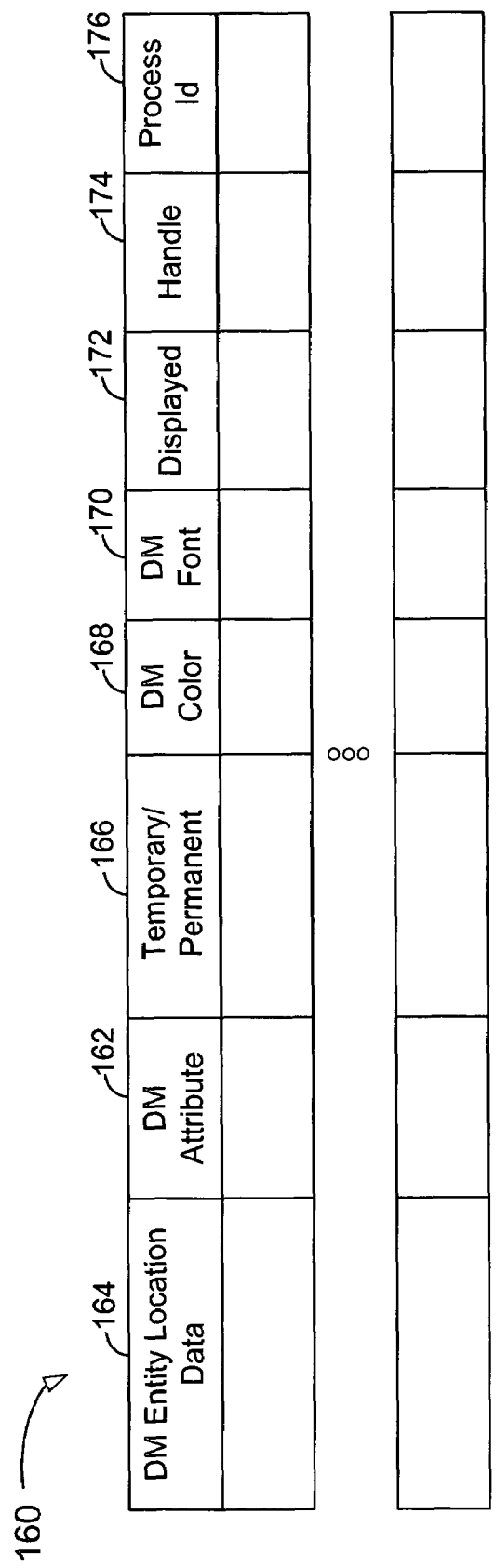
FIG. 4 depicts an embodiment of a data structure to store information associated with a DM entity.

FIG. 4 depicts an embodiment of a DM data structure 160 which associates a DM attribute 162 with DM entity location data 164. The DM data structure 160 is typically stored in the file being displayed. Alternately, the DM data structure 160 is stored in a separate file from the file being displayed. In yet another alternate embodiment, the DM data structure is stored in memory. In other embodiments, the DM data structure is stored in persistent storage. In various embodiments, the DM data structure is an array containing information for one or more DM entities, and each row of the array is associated with a DM entity. Alternately, the DM data structure may be a table. In other embodiments, one DM entity is associated with one DM data structure.

The DM entity location data 164 contains the location of the DM entity in the file. In various embodiments, for a text string, the location data comprises a starting location of the text string and the length of the text string. Alternately, for a text string and in some embodiments, for an object, the location data comprises the starting and ending locations of the text string or object. In another embodiment, for an object, the location data comprises a starting location of the object and a length of the object. Alternately, for an object, the location data comprises at least two pairs of coordinates associated with opposing corners of the object.

The DM attribute 162 contains a predetermined active-entity indication, which, when activated, indicates that the information associated with the location data 164 is a DM entity. To activate the DM attribute, a first predetermined value is stored in the DM attribute field 162. To disable the DM attribute, a second predetermined value, different from the first predetermined value, is stored in the DM attribute field 162. Alternately, to disable a DM entity, the DM entity information is removed from the DM entity data structure.

In some embodiments, a DM entity is permanent or temporary, and is associated with a permanent or temporary DM attribute, respectively. A permanent DM entity with a permanent DM attribute survives subsequent close and open operations and remains until the permanent DM attribute is manually removed. The permanent DM attribute may be applied to a DM entity in one application and then the DM entity continues to be a DM entity when the same file is opened in a different application, which also supports the DM functionality herein described. In some embodiments when a file is opened, all permanent DM entities are displayed in one or more DM areas. Alternately, when a file is opened, permanent DM entities are accumulated in DM area 74 over time as the user interacts with the application 76. For example, an architect may designate his name, company name and copyright notification as a permanent DM entity in a large CAD drawing. When that drawing is sent to a client that has a viewer application, which is a different application from the CAD program that generated the drawing, the architect's name, company name and copyright notice would be simultaneously displayed with the drawing, no matter what portion of the drawing was being viewed.

In a preferred embodiment supporting the temporary/permanent feature, the DM data structure 160 further comprises a temporary/permanent indicator 166. When the temporary/permanent indicator 166 is set to "permanent," the information in the DM data structure associated with the permanent DM entities is stored in persistent memory so that it can be accessed when the file is re-opened. In a preferred embodiment, the DM data structure is stored with the file. When the temporary/permanent indicator 166 is set to "temporary," the information in the DM data structure associated with the temporary DM entities is not stored in the file in persistent memory; for temporary entities, the associated information in the DM data structure is deleted when the file is closed. In various embodiments, when the file is closed and the temporary/permanent indicator 166 is set to "temporary," the materialization attribute is disassociated from the materialization entity. In some embodiments, when the temporary/permanent indicator is omitted, a DM entity is a permanent DM entity by default. Alternately, in other embodiments, when the temporary/permanent indicator is omitted, the DM entity is a temporary DM entity by default. In another embodiment, the DM attribute is the temporary/permanent indicator 166. In yet another embodiment, the permanent DM entities are stored in a first DM data structure, and the temporary DM entities are stored in a second DM data structure.

In yet other embodiments, the DM data structure 160 comprises a DM Color field 168 (DM Color) and a DM font field 170 (DM Font) which change the color and font of the DM entity, respectively.

In various embodiments, the DM data structure 160 comprises a displayed field (Displayed) 172, a handle field (Handle) 174 and, in some embodiments and a process identifier field (Process Id) 176. The displayed field 174 is used to store a value that indicates that the DM entity is displayed in a DM area.

The handle field 176 stores a handle to a DM entity that is displayed in a DM area; the handle is used to access the displayed DM entity in the DM area. For example, in some embodiments, the handle 176 is used to delete the DM entity from the DM area.

The process identifier field 176 stores a process identifier, commonly referred to as a process ID or PID, of the DM window displaying the DM entity. The process identifier is typically used in those embodiments which display the DM entity in a DM area in a separate DM window. In other embodiments, the process identifier 176 is omitted.

Various embodiments may be used to associate a DM attribute with a subset of information. In some embodiments, the DM attribute 162 is omitted because the presence of the location data in the DM data structure indicates that the associated information represents a DM entity. In another embodiment, the DM attribute is added to an existing data structure associated with the file.

In another embodiment, a DM attribute start tag and a DM attribute end tag are used to define the DM entity. The DM attribute start and end tags are placed in front of and after, respectively, the subset of information being designated as the DM entity. In some embodiments, the DM attribute start and end tags are hidden characters. In other embodiments, the DM attribute start and end tags are implemented as XML tags. For example, in FIG. 2, the first DM entity 122 may be designated as follows: <StartDMEntity>Exemplary text<EndDMEntity>. In some embodiments, when DM attribute start and end tags are used, the DM data structure is not used. In other embodiments, when DM attribute start and end tags are used, the DM data structure is also used.

In yet another embodiment, the DM attribute start and end tags are permanent DM attribute start and end tags to designate a permanent DM entity. In another alternate embodiment, the DM attribute start and end tags are temporary DM attribute start and end tags to designate a temporary DM entity.

In various embodiments, a DM area automatically displays a DM entity, at least in part, when at least a portion of the DM entity is scrolled out of view of or past the scrollable area. In some embodiments, once the DM area is created, the DM area remains until either the application is closed or until the DM area is closed by the user. Alternately, once the DM area is created, the DM area remains either until the application is closed, until the DM area is closed by the user or until all DM entities have been deleted. In some embodiments, when only one DM entity is displayed in the DM area, the DM area automatically disappears when at least a portion of, or alternately, the entire DM entity is scrolled back into view in the scrollable area.

In other embodiments, at least one DM window has a DM area which automatically displays the DM entity, at least in part, when at least a portion of the DM entity is scrolled out of view in or past the scrollable area. In some embodiments, the DM window may contain all of the functionality typically associated with windows, for example, the window may be relocated, closed, resized and miniaturized. Typically, when initially created, the DM window is a top window on the display. In some embodiments, once the DM window containing the DM area is created, the DM window remains on the display either until the application is closed, until the DM window is closed by the user or until all DM entities have been deleted. In some embodiments, when only one DM entity is displayed in the DM area in the DM window, the DM window automatically disappears when the entire DM entity is scrolled back into view in the scrollable area. Alternately, when only one DM entity is displayed in the DM area of the DM window, the DM window automatically disappears when at least a portion of the entire DM entity is scrolled back into view in the scrollable area.

In various embodiments, the DM window may be implemented by invoking an existing application such as word processing, graphical, computer-aided design, drawing and imaging applications. The DM entity is displayed in that application.

Figure 5:
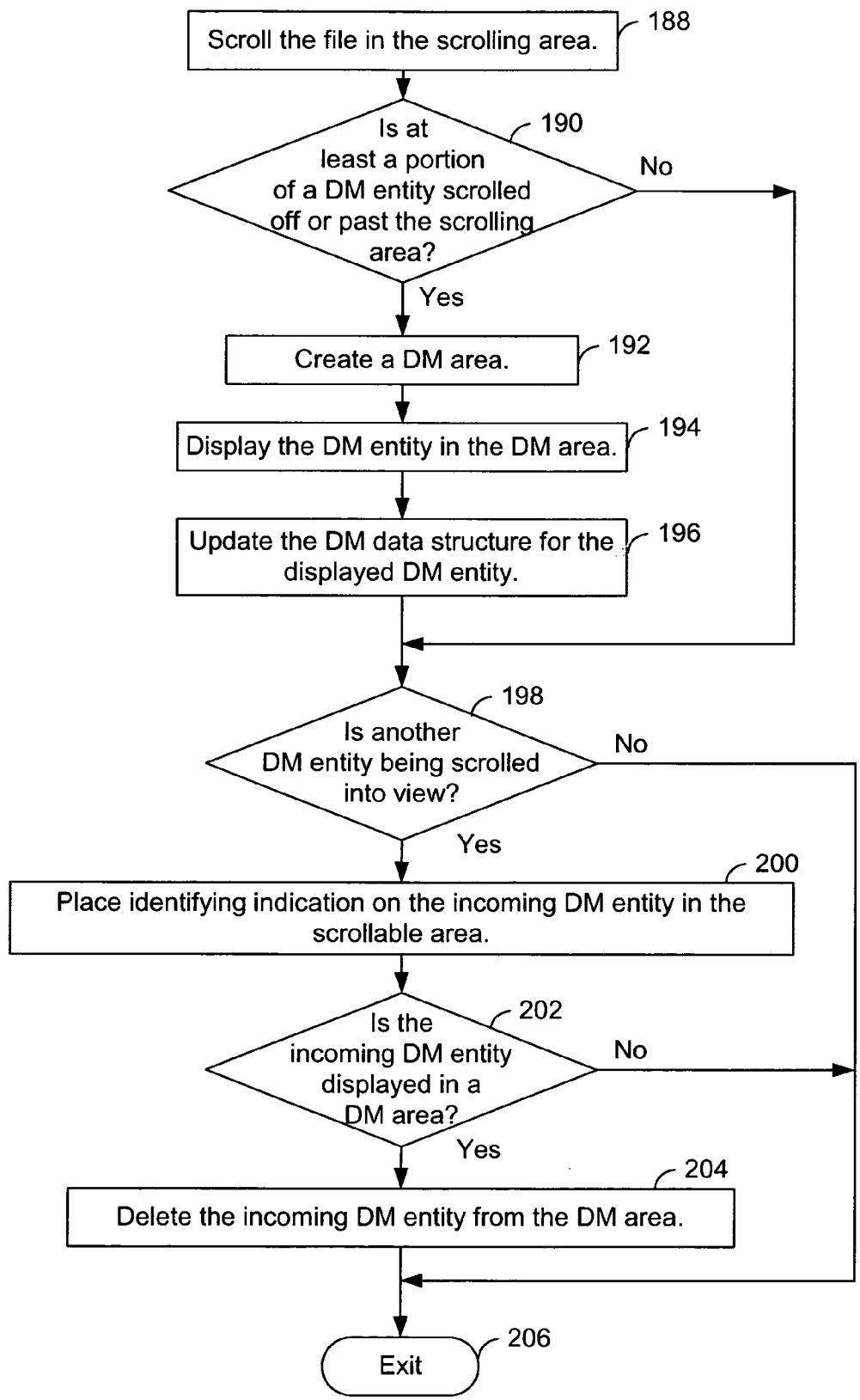
FIG. 5 depicts a flowchart of an embodiment of the operation of the scrollable area and DM area.

FIG. 5 depicts a flowchart of an embodiment of the present inventive technique. In step 188, the file containing DM entities is scrolled in the scrollable area. Typically, the file in the scrollable area may be scrolled using any means. In some embodiments, a user positions the slider on a scroll bar to display desired information in the file. The file may also be scrolled by clicking on the scrollbar itself between the slider and an opposing arrow, clicking on the opposing arrows, and using a scrolling mouse. In various embodiments, the file is repositioned or scrolled from a "goto" specified page number menu choice. In another alternate embodiment, the file is repositioned or scrolled when a search or "find" is performed. In some embodiments, a user, via a mouse, grabs (right clicks) on a location in the scrollable area and repositions the file using the mouse. In other embodiments, the file may be repositioned using hyperlinks. In another embodiment, the file in the scrollable area is scrolled by pressing a scroll "button" on a mouse. Alternately, a trackball may be used for scrolling. In yet other embodiments, the file in the scrollable area is scrolled using a key on a keyboard, for example, one of the up, down, left and right arrow keys, or one of the page up or down keys. These and numerous other methods of scrolling are familiar to those of ordinary skill in the art.

Typically, when a file is scrolled, the scrollable area handler 54 (FIG. 1) is invoked to perform the scrolling. In various embodiments, the scrollable area handler performs steps 190-206 of FIG. 5. In step 188, the scrollable area handler determines whether at least a portion of a DM entity within the scrollable area is scrolled off or past the scrollable area. In one embodiment, the scrollable area handler 54 (FIG. 1) checks the location data 164 (FIG. 4) in the DM data structure 160 (FIG. 4) for DM entities. In this embodiment, all DM entities in the DM data structure 160 (FIG. 4) are active. In some embodiments, the scrollable area handler 54 (FIG. 1) also checks the DM attribute in the DM data structure 160 (FIG. 4) to determine that the DM entity is an "active" DM entity, otherwise, that DM entity has been deleted and should not be displayed in a DM area. The scrollable area handler 54 (FIG. 1) determines whether a DM entity is scrolled out of view based on the location data of the DM entities, the direction of scrolling, and the location of the starting and current portions of the file displayed in the scrollable area. In some embodiments, for example, when a file is repositioned using a "go to" page button or search command, a DM entity may be located in a non-visible area between the portion of the file displayed at the start, and the portion of the file currently displayed. Alternately, when DM attribute start and end tags are used to designate a DM entity, the file is scanned as it is scrolled for the start tag.

When, in step 190, the scrollable area handler 54 (FIG. 1) determines that at least a portion of a DM entity is scrolled off or past the scrollable area, the scrollable area handler creates a DM area in step 192. In some embodiments, the scrollable area handler 54 (FIG. 1) creates a DM window which contains the DM area. In these embodiments, the scrollable area handler 54 (FIG. 1) retrieves a process identifier, that is, the process ID, that is associated with the DM window. In an alternate embodiment, step 192 is omitted because the DM area is created when the application window is opened. Alternately, step 192 is omitted when a user has activated the create DM area button to create the DM area. Further still, step 192 is omitted when the DM area already exists from a previous scroll operation.

In step 194, the scrollable area handler 54 (FIG. 1) displays the DM entity, at least in part, in a DM area. In some embodiments, the scrollable area handler 54 (FIG. 1) applies identifying indications to the DM entity in the DM area. The scrollable area handler 54 (FIG. 1) retrieves the color and font from the DM color and DM font fields, 168 and 170, respectively, of the DM data structure 160 (FIG. 4) and displays the DM entity in the DM area using the specified color and font. Alternately, the scrollable area handler 54 does not apply any identifying indication to the DM entity in the DM area. In some embodiments, one or more DM entities are displayed in the DM area. In other embodiments, a single DM entity is displayed in a single DM area. The scrollable area handler 54 (FIG. 1) retrieves a handle that is associated with the displayed DM entity in the DM area. The handle is used to access the displayed DM entity.

In step 196, the scrollable area handler 54 (FIG. 1) updates the DM data structure 160 (FIG. 4). The scrollable area handler 54 (FIG. 1) locates the information in the DM data structure 160 (FIG. 4) associated with the DM entity that is being displayed in the DM area based on the location data 164 (FIG. 4) in the DM data structure 160 (FIG. 4). The scrollable area handler 54 (FIG. 1) updates the displayed field 172 (FIG. 4) in the DM data structure 160 (FIG. 4) to indicate that the associated DM entity is displayed in a DM area. The scrollable area handler 54 (FIG. 1) updates the handle field 174 (FIG. 4) of the DM data structure 160 (FIG. 4) with the handle for the displayed DM entity. In some embodiments, the scrollable area handler 54 (FIG. 1) updates the process identifier field 176 (FIG. 4) of the DM data structure 160 (FIG. 4) with the process ID of the DM window containing the DM area in which the DM entity is displayed.

In step 198, the scrollable area handler 54 (FIG. 1) determines whether another DM entity is being scrolled into view in the scrollable area. In some embodiments, the scrollable area handler 54 (FIG. 1) uses the location data in the DM data structure, or alternately, DM start tag, to determine whether a DM entity is being scrolled into view. When, in step 198, the scrollable area handler 54 (FIG. 1) determines that another DM entity, referred to as an incoming DM entity, is being scrolled into view, in step 200, the scrollable area handler 54 (FIG. 1) places an identifying indication on the incoming DM entity in the scrollable area. In some embodiments, the scrollable area handler 54 (FIG. 1) retrieves the color and font information for the incoming DM entity from the DM data structure and applies that color and font to the DM entity. In various embodiments, step 200 is omitted.

In step 202, the scrollable area handler 54 (FIG. 1) determines whether the incoming DM entity is displayed in the DM area. In various embodiments, the scrollable area handler 54 (FIG. 1) checks the displayed field 172 (FIG. 4) of the DM data structure 160 (FIG. 4) for the incoming DM entity to determine if the incoming DM entity is already displayed. When step 202 determines that the incoming DM entity is displayed in a DM area, in step 204, the scrollable area handler 54 (FIG. 1) deletes the incoming DM entity from the DM area. In some embodiments, when no DM entity remains in the DM area, the scrollable area handler 54 (FIG. 1) deletes the DM area, or alternately, the DM window containing the DM area. In other embodiments, steps 202 and 204 are omitted, and incoming DM entities are not deleted from the DM area when scrolled back into view. In step 206, the scrollable area handler exits.

When step 190 determines that no portion of a DM entity has scrolled off or past the scrollable area, step 190 proceeds to step 198 to determine if another DM entity is being scrolled into view. When step 198 determines that no DM entity is being scrolled into view, the scrollable area handler 54 (FIG. 1) exits at step 206. When step 202 determines that the incoming DM entity is not displayed in a DM area, the scrollable area handler exits 54 (FIG. 1) at step 206.

FIG. 6 depicts the exemplary window 70 of FIG. 2 illustrating the display of a DM entity in the DM area 74 after scrolling the file 120 of FIG. 3. Because the first DM entity 122 (FIG. 2) has been scrolled out of view, the first DM entity 122 is displayed in the DM area 74. In some embodiments, as illustrated in FIG. 6, the DM entity 122 is displayed in the DM area 74 without any distinguishing indications. In other embodiments, the DM entity is displayed in the DM area with the distinguishing indications that were used in the scrollable area 72. The file in the scrollable area of FIG. 6 is scrolled again.

FIG. 7 depicts the scrollable area of FIG. 6 after scrolling the file. The second DM entity 124 has scrolled out of view, and is displayed in the DM area 74. In addition, at least a portion of the third DM entity 126 has been scrolled out of view and is also displayed in the DM area 74.

Subsets of information, such as text strings, objects, or a combination thereof, may be selected to provide a selected entity. In some embodiments, a graphic object may be selected by left clicking on the object, and then right clicking to display the menu of choices. Alternately, a mouse is not used and a keystroke sequence is used to select an entity. A typical characteristic of many applications is that when a right click on a mouse occurs, a menu of choices for the selected entity appears. In various embodiments, the DM attribute is a new menu choice that may be selected by the user. Text is typically selected by "highlighting" a portion of text with a press and hold of the left mouse button.

Figure 8:
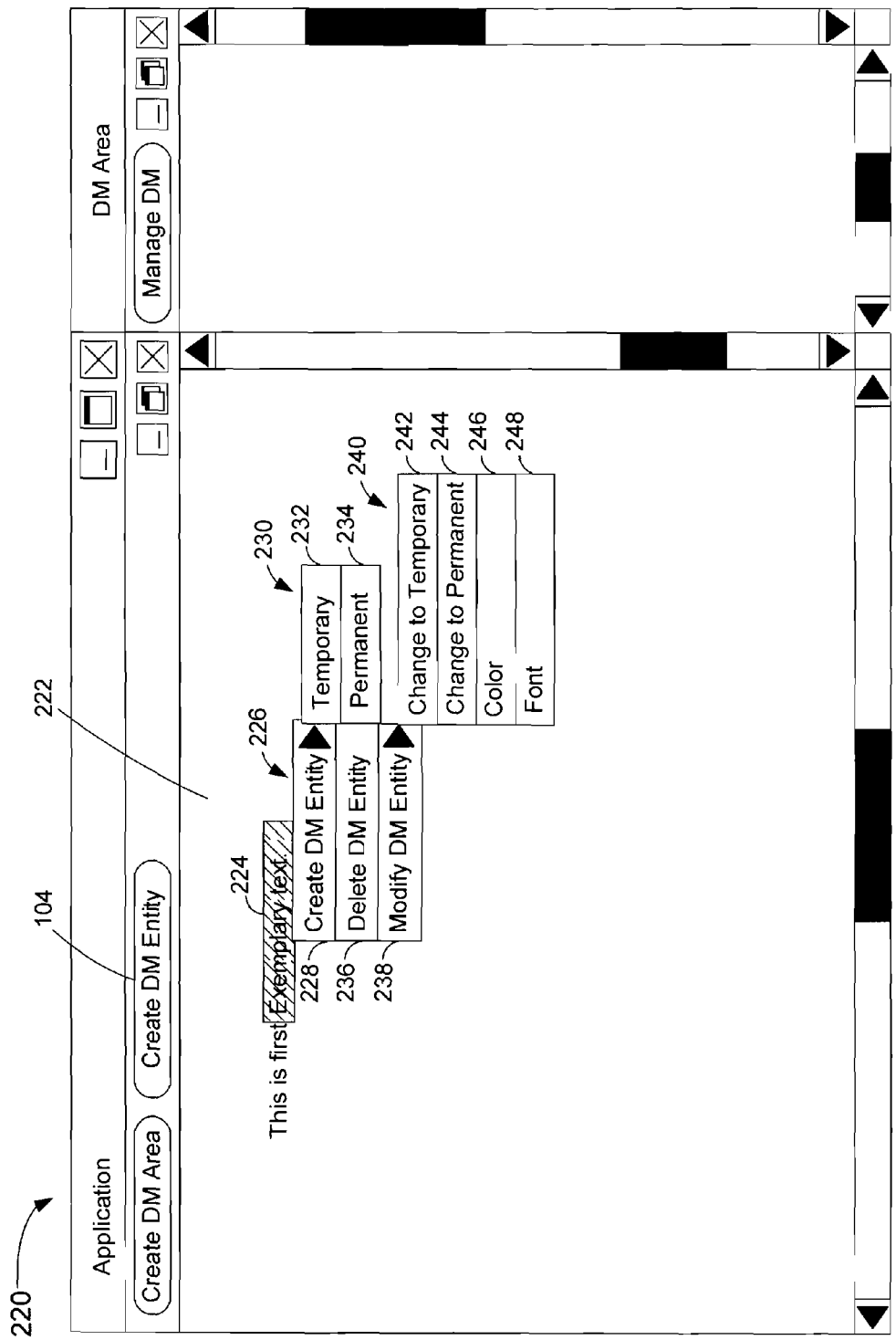
FIG. 8 depicts an embodiment of a scrollable area illustrating various menu choices.

FIG. 8 depicts an exemplary window 220 illustrating various menu choices. In a scrollable area 222, a portion of a file is displayed. A user has highlighted the phrase "Exemplary text" 224. The user has also right clicked in the scrollable area and at least a portion of a first menu 226 is shown. The first menu 226 comprises at least one of a "Create DM Entity" choice 228, a "Delete DM Entity" choice 236 and a "Modify DM Entity" choice 238. The selected information is designated as a DM entity by, in some embodiments, left clicking, on the "Create DM Entity" choice 228. In some embodiments, when the "Create DM Entity" choice 228 is selected, the create DM entity handler 58 (FIG. 1) is invoked. Alternately, the create DM entity button 104 is clicked on to create the DM entity from the selected text 224.

In other embodiments, when the "Create DM Entity" choice 228 is selected, a second menu 230 is displayed. The second menu 230 comprises a "Temporary" choice 232 and a "Permanent" 234 choice. When selected, the "Temporary" choice 232 creates a temporary DM Entity. In some embodiments, when the "Temporary" choice 232 is selected, a create temporary DM entity handler is invoked. When selected, the "Permanent" choice 234 creates a permanent DM Entity. In some embodiments, when the "Permanent" choice 234 is selected, a create permanent DM entity handler is invoked.

The "Delete DM Entity" choice 236, when selected, deletes a DM entity. In some embodiments, when the "Delete DM Entity" choice 236 is selected, the delete DM entity handler 60 (FIG. 1) is invoked.

The "Modify DM Entity" choice 238, when selected, allows a user to modify the attributes or characteristics of a DM entity. When the "Modify DM Entity" choice 238 is selected, in various embodiments, a modification menu 240 is displayed. The modification menu 240 comprises at least one or a combination of the following: a "Change to Temporary" choice 242, a "Change to Permanent" choice 244, a "Color" choice 246 and a "Font" choice 248. In various embodiments, each choice invokes an associated handler. The "Change to Temporary" choice 242 allows a DM entity to be designated as temporary and, in some embodiments, invokes the make temporary DM entity handler 66 (FIG. 1). In some embodiments, the make temporary DM entity handler 66 (FIG. 1) sets the temporary/permanent indicator 166 (FIG. 4) to indicate that the DM entity is temporary. The "Change to Permanent" choice 244 allows a DM entity allows a DM entity to be designated as permanent, and in some embodiments, invokes the make permanent DM entity handler 64 (FIG. 1). In some embodiments, the make permanent DM entity handler 66 (FIG. 1) sets the temporary/permanent indicator 166 (FIG. 4) to indicate that the DM entity is permanent. The "Color" choice 246 allows a user to designate the color of a DM entity in the scrollable area. The "Font" choice 248 allows a user to designate the font of a DM entity in the scrollable area. In some embodiments, the "Font" choice 248 allows a user to specify whether the font of a DM entity is displayed as italic, underlined or bold.

Figure 9:
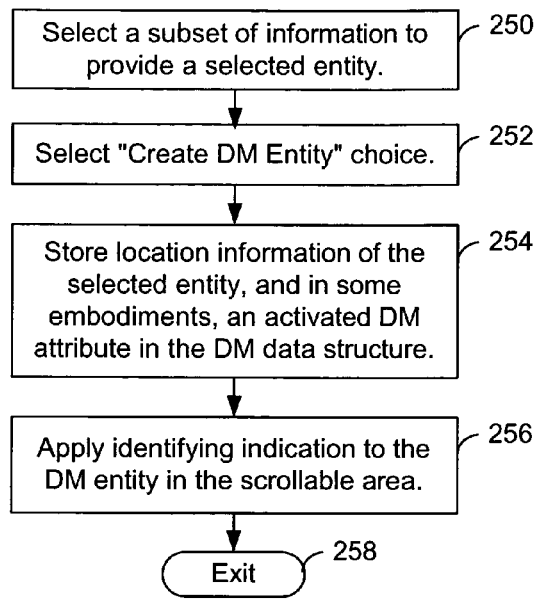
FIG. 9 depicts a flowchart of an embodiment of creating a DM entity.

FIG. 9 depicts a flowchart of an embodiment of creating a DM entity. In step 250, a subset of the information of a file is selected to provide a selected entity. The information may be selected using any well-known means. In step 252, a right click is performed over the selected entity to display a menu, in some embodiments, the menu 226 of FIG. 8. For example, the menu has three choices—create DM entity, delete DM entity and modify DM entity. The create DM entity is selected, for example by moving the cursor over the create DM entity. In this embodiment, DM entities are temporary by default. Alternately, DM entities are permanent by default.

In step 254, information designating the DM entity is stored to create the DM entity. In various embodiments, the create DM entity handler 58 (FIG. 1) implements step 254 of FIG. 9. In some embodiments, the location data of the selected entity is stored in the DM data structure. In other embodiments, the location data of the selected entity and the DM attribute representing an "activated" state is stored in the DM data structure. In yet other embodiments, tags, such as the DM attribute start and end tags, are placed in front of and after the selected entity, respectively. In step 256, an identifying indication is applied to the displayed DM entity in the scrollable area. For example, the identifying indication may automatically change the color of a DM entity. Alternately, step 256 is omitted and the appearance of the DM entity remains unchanged. In step 258, the process exits.

In other embodiments, depending on whether the temporary or permanent menu choice, 232 or 234 of FIG. 8, is selected, a temporary or permanent DM attribute, respectively, is associated with the selected entity. In some embodiments which use the create temporary DM entity handler, the create temporary DM entity handler implements the flowchart of FIG. 9, except that step 254 also sets the temporary/permanent indicator 166 (FIG. 4) to indicate that the DM entity is temporary. In other embodiments which use the create permanent DM entity handler, the create permanent DM entity handler implements the flowchart of FIG. 9, except that step 254 also sets the temporary/permanent indicator 166 (FIG. 4) to indicate that the DM entity is permanent.

Figure 10:
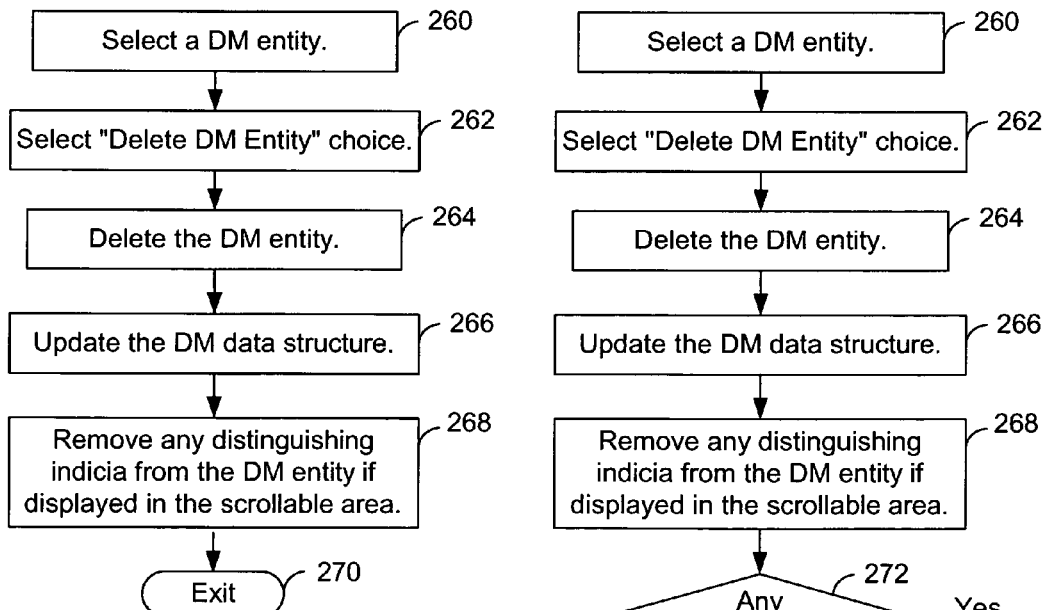
FIG. 10 depicts a flowchart of an embodiment of deleting a DM entity.

FIG. 10 depicts a flowchart of an embodiment of deleting a DM entity. In step 260, a DM entity is selected, for example, by clicking on it. In step 262, the user activates the menu and selects the "Delete DM Entity" choice. In some embodiments, steps 264-270 are implemented in the delete DM entity handler 60 (FIG. 1). In step 264, the selected DM entity is deleted from the DM area. The delete DM entity handler 60 (FIG. 1) retrieves the handle for the DM entity that has been selected, and uses the handle to delete the DM entity from the DM area. In some embodiments, when the DM area is in a separate DM window, the delete DM entity handler 60 (FIG. 1) also retrieves the process ID of the DM window. In step 266, the delete DM entity handler 60 (FIG. 1) searches the DM data structure for the DM entity associated with the handle, and in some embodiments, also associated with the process ID. In some embodiments, when the DM entity is found in the DM data structure, the DM attribute is deactivated for that DM entity. In other words, for the selected DM entity, the DM attribute is set to a deactivated state in the DM data structure. Alternately, when the DM entity is found in the DM data structure, the information for the selected DM entity is deleted from the DM data structure. In another embodiment, start and end tags designating the DM entity are deleted from the file. In step 268, in other embodiments, if the DM entity is displayed in the scrollable area and has distinguishing indicia, that distinguishing indicia is removed from the DM entity in the scrollable area. Alternately, step 268 is omitted. The process exits in step 270.

Figure 11:
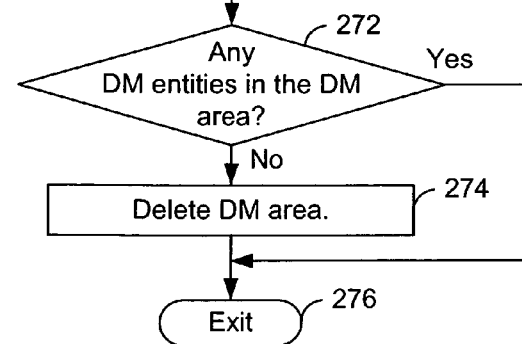
FIG. 11 depicts a flowchart of an embodiment of deleting a DM entity and a DM area when no DM entities are displayed in that DM area.

FIG. 11 depicts a flowchart of an embodiment of deleting a DM entity and a DM area when no DM entities are displayed in that DM area, in other embodiments, a DM window is deleted when no DM entities are displayed in the DM area of the DM window. Steps 260-264 are the same as in FIG. 10 and will not be further described. In various embodiments, step 266 determines whether any DM entities are displayed in the DM area associated with the deleted DM entity. When no DM entities are displayed in the DM area associated with the deleted DM entity, in step 268, the DM area is deleted. In embodiments in which the DM area is in a separate DM window, that DM window is deleted. In step 270, the process exits. In another embodiment, steps 266 and 268 are omitted. When step 266 determines that at least one DM entity is in the DM area, step 266 proceeds to step 270 to exit.

In some embodiments, various other handlers may be invoked to store a selected color and font for a DM entity in the DM data structure in response the selection of the "Color" and "Font" choices, 246 and 248, respectively, of FIG. 8. The color allows a user to set the color of a DM entity in the scrollable area. The font choice allows a user to set the font of a DM entity in the scrollable area. The font may also be selected in any well-known manner, for example, from another sub-menu. In some embodiments, if selected, the color and font for the DM entity are stored in the DM data structure. The color can be set in any well-known manner, for example, by selecting a color from a palette of colors.

Figure 12:
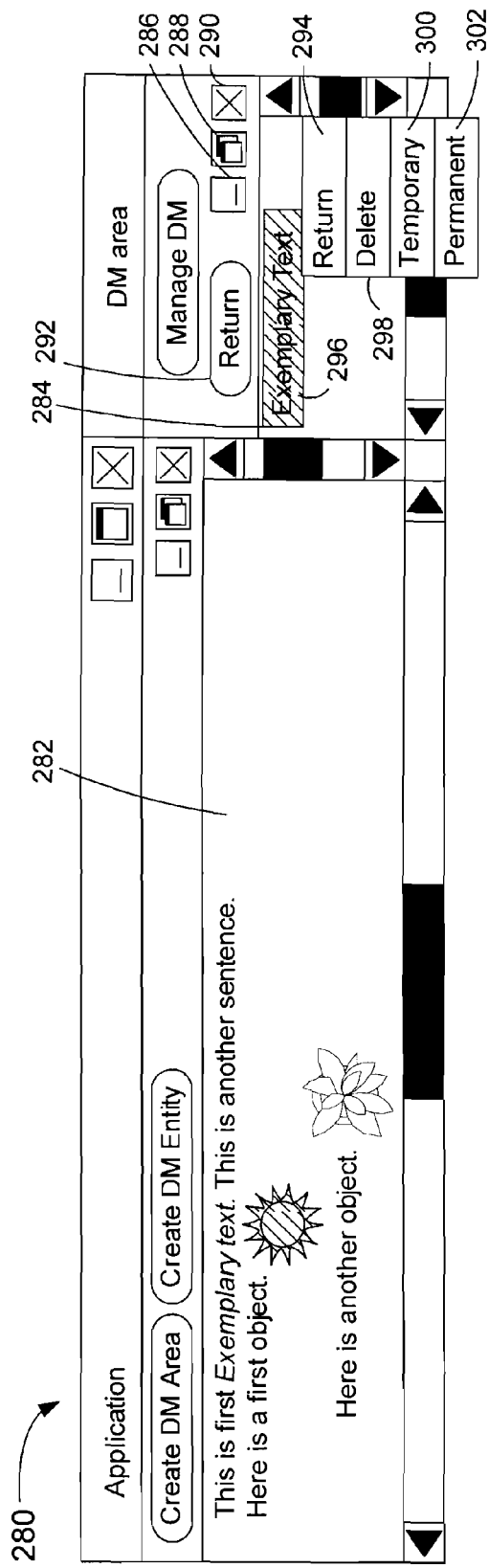
FIG. 12 depicts an embodiment of a scrollable area and a DM area illustrating various menu choices.

FIG. 12 depicts a window 280 having an exemplary scrollable area 282 and DM area 284. In some embodiments, the DM area 284 comprises at least one of minimize, maximize and close buttons, 286, 288 and 290, respectively. When a user selects the DM entity, and clicks on the return button 292, the return handler 62 (FIG. 1) is invoked. The return handler 62 (FIG. 1) causes the file to be scrolled such that the DM entity is displayed in the scrollable area 282. In some embodiments, return handler 62 (FIG. 1) removes the DM entity from the DM area; and in other embodiments, the DM entity remains in the DM area.

In another embodiment, double clicking on a DM entity in the DM area with the left mouse key causes the file to be scrolled such that the DM entity is displayed in the scrollable area, and removes the DM entity from the DM area. In various embodiments, when the DM window is created, the application passes the information that the return handler will use to cause the file that is displayed in the scrollable area to repositioned such that the DM entity is displayed in the scrollable area.

In some embodiments, when a user right clicks on a selected DM entity 296 in the DM area 284, a DM menu is displayed. The DM menu comprises at least one of a "Return" choice 294 as described above, "Delete" choice 298 to delete the DM entity, a "Temporary" choice 300 to designate the DM entity as temporary, and a "Permanent" choice 302 to designate the DM entity as permanent. In various embodiments, the "Delete" choice 298 invokes the delete DM entity handler 60 (FIG. 1), and the "Temporary" and "Permanent" choices, 300 and 302, respectively, invoke corresponding handlers described above for the menus in the scrollable area.

Figure 13:
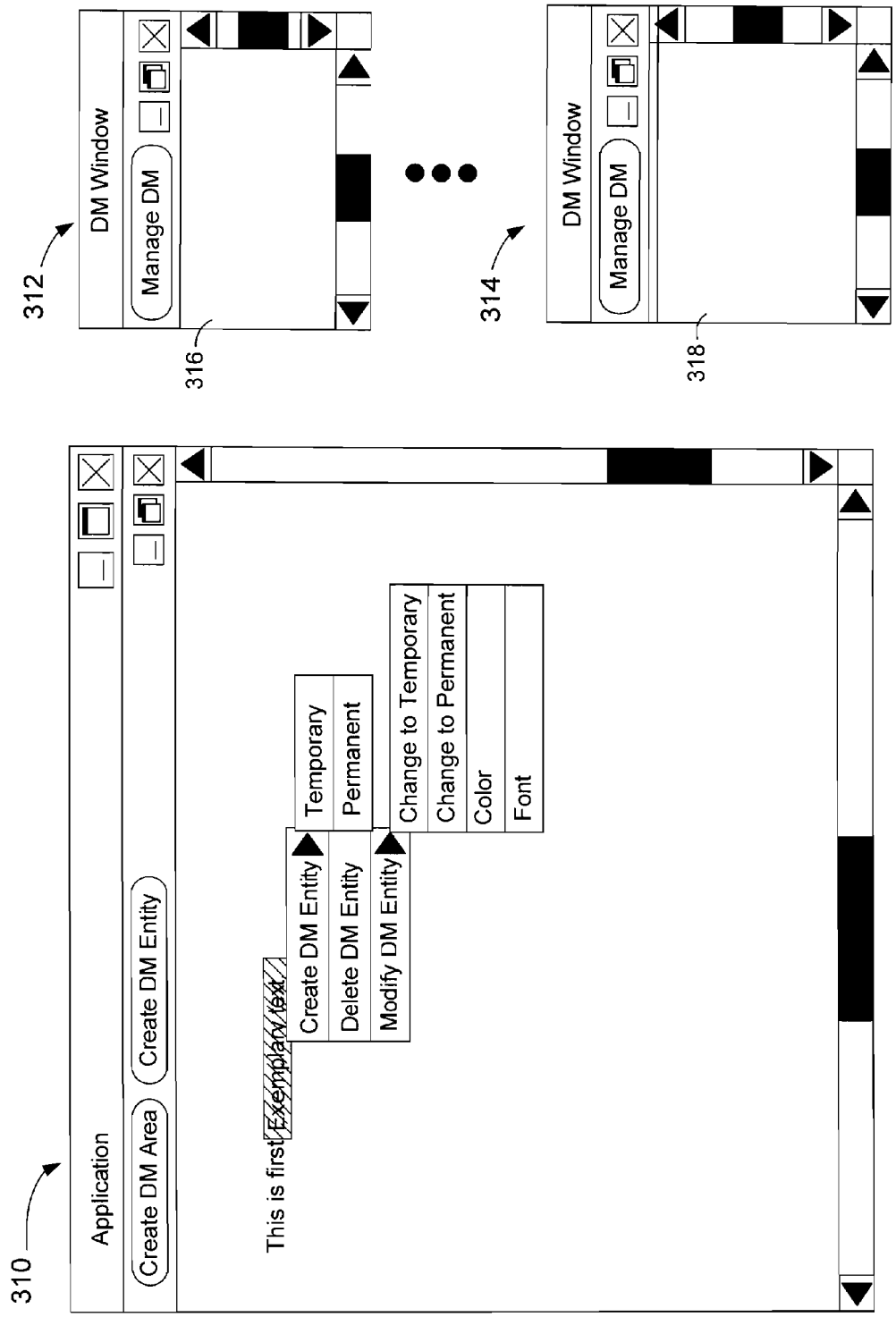
FIG. 13 depicts an embodiment of a scrollable area in a first window, and DM windows, each having a DM area, in non-overlapping separate windows.

FIG. 13 depicts an exemplary scrollable area in a first window 310, and separate non-overlapping, DM windows 312 to 314 which have respective DM areas, 316 to 318. In this embodiment, each DM window is limited to one DM entity in its DM area. In some embodiments, scrollbars are not provided for the DM area, and the DM area is sized to display the DM entity. Various embodiments of the DM window, 316 and 318, comprise the DM menu described above. In these embodiments, the DM entity is not selected prior to pressing the DM manage button or activating the DM menu. In some embodiments, when the user clicks on the return choice in the DM menu, the scrollable area displays that DM entity in the scrollable area. In alternative embodiments, clicking on a DM entity in the DM area activates the return function. In other embodiments, when the DM entity is deleted from a DM area in a DM window, the DM window invokes a delete DM entity from window handler which in some embodiments implements the flowchart of FIG. 11. In various embodiments, the delete DM entity from window handler removes the DM entity from the DM area, updates the DM data structure, removes any distinguishing indicia from the DM entity if displayed in the scrollable area, and in some embodiments, when no DM entities are displayed in the DM area, deletes the DM area and DM window.

Figure 14:
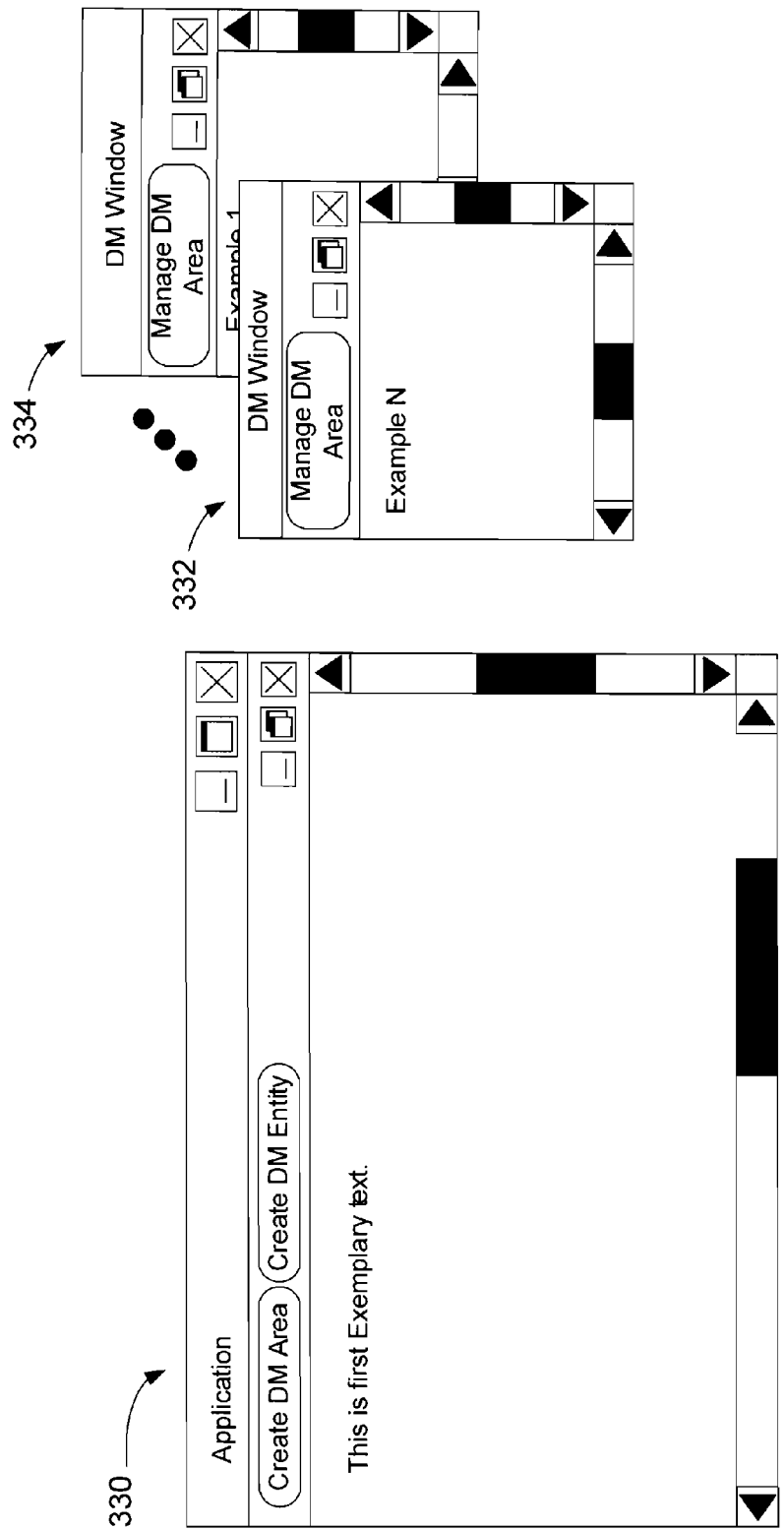
FIG. 14 depicts an embodiment of an exemplary scrollable area in a first window, and DM windows, each having a DM area, in overlapping separate windows.

FIG. 14 depicts an embodiment comprising an exemplary scrollable area in a first window 330, and DM windows having a DM area in overlapping separate DM windows, 332-334.

Figure 15:
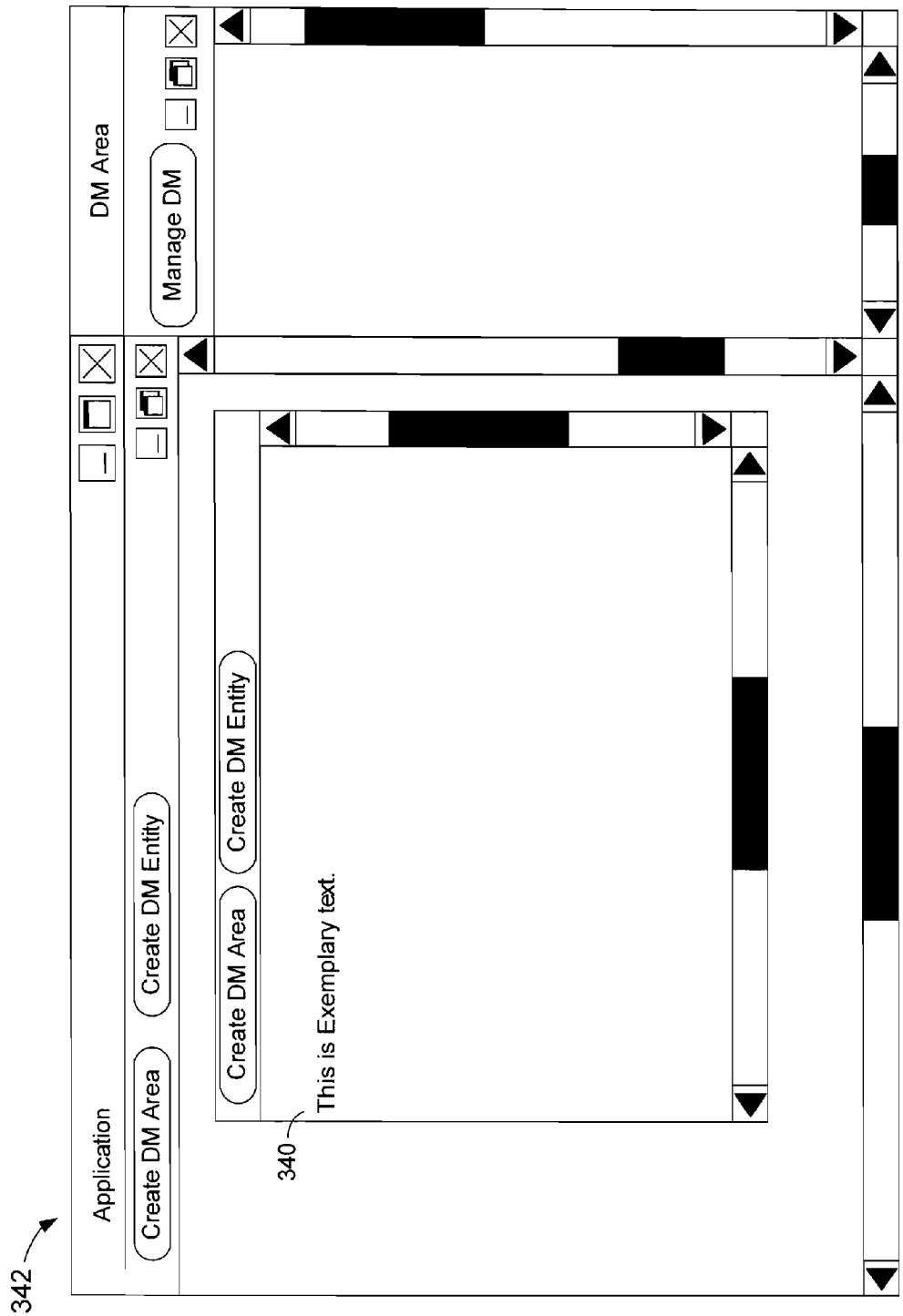
FIG. 15 depicts an exemplary scrollable area which uses a portion of a first window.

FIG. 15 depicts another embodiment having an exemplary scrollable area 340 which uses a portion of a window 342.

In another embodiment, the DM area comprises one or more buttons or menu choices within the DM window to provide copy and paste functionality.

The foregoing description of the preferred embodiments of the inventions has been presented for the purposes of illustration and description. It is not intended to be exhaustive or to limit the invention to the precise form disclosed. Many modifications and variations are possible in light of the above teachings. It is intended that the scope of the invention be limited not by this detailed description, but rather by the claims appended thereto.

What is claimed is:

1. A method of displaying information, comprising:
presenting a first subset of information in a scrollable area, the first subset of information comprising, at least in part, a second subset of information, the second subset of information being designated as a materialization entity, wherein the materialization entity is not displayed in a materialization area;
scrolling the scrollable area;
in response to at least a portion of the materialization entity being scrolled out of view in the scrollable area, displaying the materialization entity, at least in part, in the materialization area, wherein the materialization area is separate from the scrollable area; and
in response to the materialization entity being scrolled back into view in the scrollable area, removing the materialization entity from the materialization area.

2. The method of claim 1 further comprising:
associating a materialization attribute with the materialization entity to designate the second subset of information as the materialization entity.

3. The method of claim 1 wherein the scrollable area is in a window and the materialization area is also in that same window.

4. The method of claim 1 wherein the scrollable area is in a first window, and wherein the materialization area is in a second window, different from the first window, to provide a materialization window.

5. The method of claim 4 wherein the materialization window is adjacent to the first window.

6. The method of claim 1 further comprising:
in response to the at least a portion of the materialization entity being scrolled out of view in the scrollable area, displaying the materialization area.

7. The method of claim 1 further comprising:
displaying the materialization area in response to a user activation.

8. The method of claim 1 further comprising:
in response to the materialization entity being scrolled back into view in the scrollable area, deleting the materialization area containing the materialization entity.

9. The method of claim 4 wherein a third subset of the information of the first subset of information is designated as an additional materialization entity; and
in response to at least a portion of the additional materialization entity being scrolled out of view in the scrollable area, displaying a third window comprising the additional materialization entity, at least in part, in a materialization area of the third window, wherein the third window is separate from the first window and the second window.

10. The method of claim 1 further comprising:
in response to a user signal with respect to the materialization entity in the materialization area, scrolling the first subset of information such that the materialization entity is displayed in the scrollable area.

11. The method of claim 2 wherein the materialization entity is associated with a materialization entity designation of temporary, further comprising:
in response to a user signal to not view the first subset of information, disassociating the materialization attribute from the materialization entity.

12. The method of claim 1 wherein the materialization entity is associated with a materialization entity designation of permanent, further comprising when the materialization entity designation is permanent, storing the materialization entity designation in persistent storage.

13. The method of claim 1 wherein the materialization entity comprises the second subset of information, wherein said displaying of the materialization entity displays at least a portion of the second subset of information in the materialization area.

14. The method of claim 1 further comprising:
receiving a selection of the second subset of information on a graphical user interface; and
in response to an activation of a create materialization entity control of the graphical user interface, designating the second subset of information as the materialization entity.

15. The method of claim 1 wherein the materialization entity is tagged information.

16. A method of displaying information, comprising:
presenting information in a scrollable area;
receiving a selection of a subset of the information;
in response to receiving a create materialization entity activation, designating the subset of the information as a materialization entity;
scrolling the scrollable area;
in response to at least a portion of the materialization entity being scrolled out of view in the scrollable area, displaying the materialization entity in a materialization area, wherein the materialization area is separate from the scrollable area; and
in response to the materialization entity being scrolled back into view in the scrollable area, removing the materialization entity from the materialization area.

17. The method of claim 16 wherein the subset of information is designated as a materialization entity using tags.

18. The method of claim 1 wherein the materialization area is displayed in response to the at least a portion of the materialization entity being scrolled out of view in the scrollable area.

19. A computer-implemented method of displaying information, comprising:
displaying a first subset of information in a scrollable area, the first subset of information comprising a tagged information, the tagged information being a materialization entity, wherein the tagged information is not displayed in a materialization area;
scrolling the scrollable area;
in response to at least a portion of the tagged information being scrolled out of view in the scrollable area, displaying the tagged information, at least in part, in the materialization area, wherein the materialization area is separate from the scrollable area; and
in response to the tagged information being scrolled back into view in the scrollable area, removing the tagged information from the materialization area, wherein the tagged information is not displayed in the materialization area.

20. The method of claim 19 wherein the tagged information comprises text.

21. The method of claim 19 wherein the tagged information comprises at least one object.

22. The method of claim 19 wherein the materialization entity is designated using XML tags.

23. The method of claim 19 wherein the materialization entity is designated using a start materialization entity tag and an end materialization entity tag.

24. The method of claim 19 wherein the materialization area is displayed in response to the at least a portion of the tagged information being scrolled out of the scrollable area.

25. A computer-implemented method, comprising:
displaying a subset of information of a file in a scrollable area, wherein a portion of the subset of information that is displayed is designated as a materialization entity;
scrolling the scrollable area;
in response to the materialization entity being scrolled out of view in the scrollable area, displaying the materialization entity in a materialization area, wherein the materialization area is separate from the scrollable area; and
in response to the materialization entity being scrolled back into view in the scrollable area, removing the materialization entity from the materialization area.

26. The method of claim 25 further comprising:
prior to said displaying, receiving a selection of the portion of the subset of information; and
in response to receiving a create materialization entity activation, designating the portion of the subset of information as the materialization entity.

27. A computer program product for displaying information, comprising:
a computer readable storage medium;
first program instructions to present a first subset of information in a scrollable area, the first subset of information comprising, at least in part, a second subset of information, the second subset of information being designated as a materialization entity, wherein the materialization entity is not displayed in a materialization area;
second program instructions to scroll the scrollable area;
third program instructions to, in response to at least a portion of the materialization entity being scrolled out of view in the scrollable area, display the materialization entity, at least in part, in the materialization area, wherein the materialization area is separate from the scrollable area; and fourth program instructions to, in response to the materialization entity being scrolled back into view in the scrollable area, remove the materialization entity from the materialization area;

wherein the first, second, third and fourth program instructions are stored on the computer readable storage medium.

28. The computer program product of claim 27 further comprising:

fifth program instructions to associate a materialization attribute with the materialization entity to designate the second subset of information as the materialization entity;

wherein the fifth program instructions are stored on the computer readable storage medium.

29. The computer program product of claim 27 wherein the scrollable area is in a window and the materialization area is also in that same window.

30. The computer program product of claim 27 wherein the scrollable area is in a first window, and wherein the materialization area is in a second window, different from the first window, to provide a materialization window.

31. The computer program product of claim 27 further comprising:

fifth program instructions to, in response to the at least a portion of the materialization entity being scrolled out of view in the scrollable area, display the materialization area;

wherein the fifth program instructions are stored on the computer readable storage medium.

32. The computer program product of claim 27 further comprising:

fifth program instructions to display the materialization area in response to a user activation;

wherein the fifth program instructions are stored on the computer readable storage medium.

33. The computer program product of claim 27 further comprising:

fifth program instructions to, in response to the materialization entity being scrolled back into view in the scrollable area, delete the materialization area containing the materialization entity;

wherein the fifth program instructions are stored on the computer readable storage medium.

34. The computer program product of claim 30 wherein a third subset of the information of the first subset of information is designated as an additional materialization entity; and fifth program instructions to, in response to at least a portion of the additional materialization entity being scrolled out of view in the scrollable area, display a third window comprising the additional materialization entity, at least in part, in a materialization area of the third window, wherein the third window is separate from the first window and the second window;

wherein the fifth program instructions are stored on the computer readable storage medium.

35. The computer program product of claim 27 further comprising:

fifth program instructions to, in response to a user signal with respect to the materialization entity in the materialization area, scroll the first subset of information such that the materialization entity is displayed in the scrollable area;

wherein the fifth program instructions are stored on the computer readable storage medium.

36. The computer program product of claim 27 further comprising:

fifth program instructions to receive a selection of the second subset of information on a graphical user interface; and sixth program instructions to, in response to an activation of a create materialization entity control of the graphical user interface, designate the second subset of information as the materialization entity;

wherein the fifth and sixth program instructions are stored on the computer readable storage medium.

37. The computer program product of claim 27 wherein the materialization entity is tagged information.

38. A computer system, comprising:

a processor; and a memory storing instructions, that are executable by the processor, to:

present a first subset of information in a scrollable area, the first subset of information comprising, at least in part, a second subset of information, the second subset of information being designated as a materialization entity, wherein the materialization entity is not displayed in a materialization area;

scroll the scrollable area;

in response to at least a portion of the materialization entity being scrolled out of view in the scrollable area, display the materialization entity, at least in part, in the materialization area, wherein the materialization area is separate from the scrollable area; and in response to the materialization entity being scrolled back into view in the scrollable area, remove the materialization entity from the materialization area.

39. The computer system of claim 38 wherein the memory further comprises instructions to:

associate a materialization attribute with the materialization entity to designate the second subset of information as the materialization entity.

40. The computer system of claim 38 wherein the scrollable area is in a window and the materialization area is also in that same window.

41. The computer system of claim 38 wherein the scrollable area is in a first window, and wherein the materialization area is in a second window, different from the first window, to provide a materialization window.

42. The computer system of claim 38, wherein the memory further comprises instructions to:

in response to the at least a portion of the materialization entity being scrolled out of view in the scrollable area, display the materialization area.

43. The computer system of claim 38, wherein the memory further comprises instructions to:

display the materialization area in response to a user activation.

44. The computer system of claim 38, wherein the memory further comprises instructions to:

in response to the materialization entity being scrolled back into view in the scrollable area, delete the materialization area containing the materialization entity.

45. The computer system of claim 41 wherein a third subset of the information of the first subset of information is designated as an additional materialization entity; and the memory further comprises instructions to:

in response to at least a portion of the additional materialization entity being scrolled out of view in the scrollable area, display a third window comprising the additional materialization entity, at least in part, in a materialization area of the third window, wherein the third window is separate from the first window and the second window.

46. The computer system of claim 38, wherein the memory further comprises instructions to:
in response to a user signal with respect to the materialization entity in the materialization area, scroll the first subset of information such that the materialization entity is displayed in the scrollable area.

47. The computer system of claim 38, wherein the memory further comprises instructions to:

receive a selection of the second subset of information on a graphical user interface; and in response to an activation of a create materialization entity control of the graphical user interface, designate the second subset of information as the materialization entity.

48. The computer system of claim 38 wherein the materialization entity is tagged information.

* * * * *